United States Patent
Audebet et al.

(10) Patent No.: US 12,014,848 B2
(45) Date of Patent: Jun. 18, 2024

(54) FLAME-RETARDANT CABLE WITH SELF-EXTINGUISHING COATING LAYER

(71) Applicant: Prysmian S.P.A., Milan (IT)

(72) Inventors: Pauline Audebet, Milan (IT); Vito Scrima, Milan (IT); Luigi Caimi, Lomagna (IT); Flavio Casiraghi, Osnago (IT)

(73) Assignee: Prysmian S.P.A., Milan (IT)

( * ) Notice: Subject to any disclaimer, the term of this patent is extended or adjusted under 35 U.S.C. 154(b) by 0 days.

(21) Appl. No.: 17/454,080

(22) Filed: Nov. 9, 2021

(65) Prior Publication Data
US 2022/0148760 A1 May 12, 2022

(30) Foreign Application Priority Data
Nov. 11, 2020 (IT) .................. 102020000026897

(51) Int. Cl.
| | | |
|---|---|---|
| *H01B 7/295* | (2006.01) | |
| *C09D 5/18* | (2006.01) | |
| *C09D 7/61* | (2018.01) | |
| *C09D 7/63* | (2018.01) | |
| *C09D 123/06* | (2006.01) | |
| *C09D 123/08* | (2006.01) | |
| *H01B 3/44* | (2006.01) | |

(52) U.S. Cl.
CPC .............. *H01B 7/295* (2013.01); *C09D 5/18* (2013.01); *C09D 7/61* (2018.01); *C09D 7/63* (2018.01); *C09D 123/06* (2013.01); *C09D 123/0853* (2013.01); *H01B 3/441* (2013.01)

(58) Field of Classification Search
CPC ....................................................... H01B 7/295
See application file for complete search history.

(56) References Cited

U.S. PATENT DOCUMENTS

| | | | |
|---|---|---|---|
| 7,438,748 B2 | 10/2008 | Cogen et al. | |
| 2008/0093107 A1 | 4/2008 | Amigouet et al. | |
| 2015/0284537 A1* | 10/2015 | Henze | C08K 5/521 |
| | | | 524/127 |

FOREIGN PATENT DOCUMENTS

| | | | |
|---|---|---|---|
| CN | 107163370 A | | 9/2017 |
| CN | 108164792 A | | 6/2018 |
| JP | 2007070483 A | | 3/2007 |
| JP | 2017-031337 | * | 2/2017 |

(Continued)

OTHER PUBLICATIONS

Search Report issued Jul. 25, 2021 in Italian Patent Application No. IT 202000026897 (with English translation of categories), 3 pages.

*Primary Examiner* — Chau N Nguyen
(74) *Attorney, Agent, or Firm* — Element IP, PLC

(57) ABSTRACT

A flame-retardant cable having a core is disclosed. The cable contains at least one conductor and a coating made from a low smoke zero halogen flame-retardant polymer composition. The polymer composition contains a halogen free base polymer added with a) less than 170 phr of at least one metal hydroxide; b) from 1 to 10 phr of a phyllosilicate clay; c) at least 1 phr and less than 10 phr of melamine or a derivative thereof; and d) an alkali or alkaline-earth metal carbonate. The cable has improved reaction to fire performances especially in that no dripping occurs during burning, which renders it compliant with the requirements of the more recent international standards.

14 Claims, 2 Drawing Sheets

(56) References Cited

FOREIGN PATENT DOCUMENTS

Figure 1:
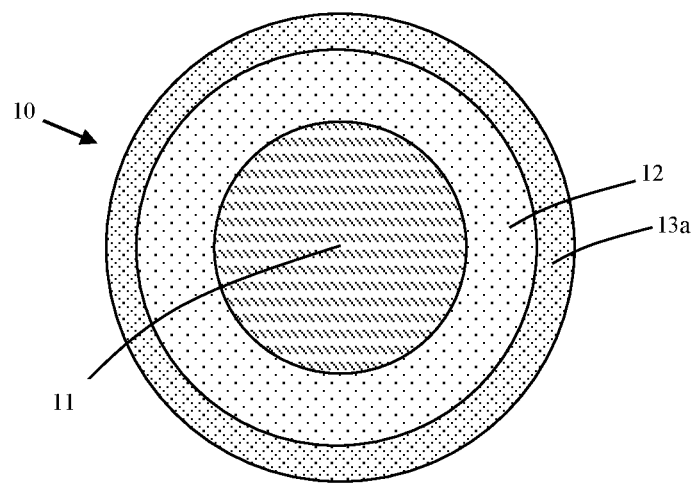

| WO | WO-2004074361 A1 | 9/2004 |
| WO | WO-2016141086 A1 | 9/2016 |

* cited by examiner

FLAME-RETARDANT CABLE WITH SELF-EXTINGUISHING COATING LAYER

FIELD OF APPLICATION

The present disclosure relates to a flame-retardant cable.

In particular, the present disclosure relates to a flame-retardant electrical, optical or hybrid cable having a low-smoke zero-halogen (LSOH) self-extinguishing coating layer which exhibits substantially no dripping (occurrence of flaming droplets) when exposed to high temperatures, e.g. in case of fire.

PRIOR ART

As known, an important requirement for cables, especially for building or transport application, is a suitable behaviour in case of fire to avoid flame propagation and smoke generation in populated environment.

In this connection, international qualification standards require that, in case of fire, cables, either electric or optical or both (hybrid cables), have limited flame and toxic smoke production and spread, and low or no flaming droplet production. Such standards are more and more stringent about the performances required to a flame-retardant cable to the end of improving the safety in buildings and transports in case of fire.

The performances against fire can be assured by one or more cable coatings, such as the electric insulation or a cable sheath, endowed with certain properties when flamed.

In this connection, it is known to produce a cable coating from a polymer composition provided with fire resistance and/or flame-retardant properties by the addition of suitable fillers. In particular, the production of flame-retardant cables is currently directed towards the use of halogen-free and low-smoke materials (LSOH) using polyolefin-based compositions (e.g. polyethylene and/or polyethylene copolymers, optionally cross-linked) filled with inorganic hydroxide fillers, such as magnesium hydroxide and/or aluminium hydroxide, which confer flame-retardant properties to a cable coating layer.

However, this solution has the drawback of requiring large quantities of filler in order to achieve a satisfactory level of effectiveness in terms of retarding flame propagation or self-extinguishing properties. By way of example the amount of metallic hydroxide(s) such as aluminium hydroxide and/or magnesium hydroxide should typically range from 170 to 200 phr of the total polymeric composition. The use of such amounts can lead to a considerable increase in the viscosity of the material and consequently to a significant decrease in extrusion speeds, thus leading to a drop in productivity. Adding high quantities of flame-retardant additives as above also may lead to a substantial deterioration in the mechanical properties of the resulting cable.

Moreover, the use of the above amounts of flame-retardant fillers, such as magnesium hydroxide and/or aluminium hydroxide, to the polymer base material of the cable does not prevent the formation of flaming droplets when the cable is exposed to high temperatures e.g. in case of fire, unless the flame-retardant filler is used in great amount which, on the other side, could impair the mechanical features of the cable, beside increasing its cost and the manufacturing difficulty.

JP2007070483 relates to a non-halogen flame retardant composition for covering electric wires and cables. The composition is composed of an ethylene-based polymer, and (a) 30 to 100 parts by weight of a metal hydroxide per 100 parts by weight of the ethylene-based polymer, (b) 1 to 10 parts by weight of nanoclay. Examples of the (a) metal hydroxide include magnesium hydroxide and aluminium hydroxide. The nanoclay of (b) is layered such as montmorillonite or bentonite and is said to have dripping prevention property at the time of the combustion. However, JP2007070483 states that although this effect is remarkable when aluminium hydroxide is used for the metal hydroxide of (a), it is hardly recognized when magnesium hydroxide is used. Other non-halogen flame retardants can also be blended within a range that does not impair the effects sought. Such halogen-free flame retardants include melamine-based nitrogen-based flame retardants, and calcium carbonate.

U.S. Pat. No. 7,438,748 relates to a flame-retardant composition that is useful for wire-and-cable applications. The flame-retardant composition comprises a polyolefin polymer and effective amounts of a nano-silicate, a metal hydroxide, and calcium carbonate. The nano-silicates are effective at a concentration of 0.1 percent to 15 percent by weight, based on the total formulation.

CN108164792 relates to a cable cross-linked low-smoke halogen-free flame-retardant polyolefin insulation material, which comprises, inter alia, the following parts by weight: ethylene-vinyl acetate 40~70; high density polyethylene 10~50; compatilizer (such as maleic anhydride grafted metallocene LLDPE) 10~20; flame retardant A (at least one of magnesium hydroxide, aluminium hydroxide and basic magnesium carbonate) 140~180, and flame retardant B (at least one of melamine, melamine polyphosphate, zinc borate, ammonium polyphosphate and red phosphorous flame retardant) 2~10.

US 2008/0093107 relates to a cable capable of withstanding extreme temperature conditions. The cable comprises at least one insulating covering or at least one sheath made from a fire-resistant composition comprising a polymer and a fibrous phyllosilicate. The fibrous phyllosilicate of the fire-resistant composition is selected from sepiolite, palygorskite, attapulgite, kalifersite, loughlinite, and falcondoite, and is preferably sepiolite. The fire-resistant composition includes 5 to 30 parts by weight of fibrous phyllosilicate. The fire-resistant composition is also provided with a secondary filler that is constituted by at least one compound selected from metallic hydroxides and metallic carbonates. The fire-resistant composition includes 150 to 200 parts by weight of secondary filler per 100 parts by weight of polymer.

WO 2016/141086 discloses a cable having an insulation layer formed from a halogen-free fire-retardant composition comprising: about 100 parts by weight of an oxygen-containing base polymer such as an EVA copolymer; from about 80 parts to about 175 parts, by weight, of a primary filler, the primary filler comprising a metal hydroxide such as magnesium hydroxide, aluminium hydroxide or a combination thereof; and from about 5 parts to about 20 parts, by weight, of a secondary filler, the secondary filler comprising an antimony compound such as antimony trioxide.

In view of the above, cables having a coating layer based on polymer compositions including a mixture of flame-retardant filler(s) and flame-retardant aid(s) are to be carefully considered. The combination of different fillers/additives or of different amounts thereof can, in fact, provide unpredictable and unwanted results.

SUMMARY OF THE DISCLOSURE

Thus, a main object of the present disclosure is providing a flame-retardant cable having a self-extinguishing layer which exhibits substantially no dripping (occurrence of flaming droplets) when exposed to high temperatures, e.g. in case of fire, so as to meet the stricter requirements for certification according to the current international standards.

Another object of the present disclosure is providing a flame-retardant cable as above which, in addition to exhibit substantially no dripping under fire, maintains good mechanical properties and is easily workable, particularly in extrusion processes.

The Applicant found that a cable, either electric or optical or hybrid, exhibits improved flame-retardant and self-extinguishing properties, particularly a substantially null dripping under fire, when it is provided with a coating layer made of a polymer composition comprising at least one metal hydroxide as flame-retardant filler and a specific combination of flame-retardant aids in specific amount ranges.

Accordingly, the present disclosure relates to a flame-retardant cable having a core comprising at least one conductor, and a coating layer made from a low smoke zero halogen (LSOH) flame-retardant polymer composition comprising a halogen free base polymer added with:
 a) less than 170 phr of at least one metal hydroxide;
 b) from 1 to 10 phr of a phyllosilicate clay;
 c) at least 1 phr and less than 10 phr of melamine or a derivate thereof; and
 d) an alkali or alkaline-earth metal carbonate.

The cable according to the present disclosure can be an electric or an optical cable. In the first case, the conductor is an electric conductor made, for example, of an electrically conductive metal. In the second case, the conductor is an optical fibre comprising a glass core and one or more polymeric protective layers made, for example, of cured acrylate and/or polyolefin composition up to a diameter of about 1,000 μm. The cable of the present disclosure can also comprise both electric conductor/s and optical fibre/s, thus being a hybrid cable.

The electric cable according to the present disclosure can be suitable for telecommunication or for carrying current at low voltage (LV; up to 1 kV) or medium voltage (MV; from 1 to 30-35 kV). The electric cable of the disclosure can be a single core or a three-phase one.

In an embodiment, the coating layer made from the polymeric composition of the present disclosure can be a sheath surrounding the conductor. In the case of an electric cable for telecommunication or LV current carry, the present coating can be an electrically insulating layer surrounding the conductor and in direct contact thereto and/or a jacket surrounding an electrically insulating layer which can be flame-retardant or not. In the case of an optical cable, the present coating can be a module containing the optical fibre/s or a tube surrounding the optical fibres and other cable components such strength members or as water barrier layer. In the case of a hybrid cable, the above-mentioned possibilities are envisaged, mutatis mutandis. In an embodiment, the coating layer is the outermost cable layer.

In another embodiment, the coating layer made from the polymeric composition of the present disclosure can be a skin layer covering the outermost cable layer or, in the case of an electric cable for telecommunication or LV current carry, the electrically insulating layer. In an embodiment, the skin layer has a thickness of from 0.05 to 0.5 mm.

The Applicant found that a cable provided with a flame-retardant and self-extinguishing coating layer made from a composition as specified above has improved reaction to fire in terms of a substantially absence of dripping during burning which allow the cable to be certified to pass specific qualification standards, like the EU Construction Products Regulation 305/2011 ('the CPR'). In addition, the Applicant found that the provision of a coating layer as specified above allows imparting suitable flame-retardant properties and substantially no dripping under fire to the cable without impairing its mechanical properties as well as allowing a suitable workability of the polymer material forming the coating layer, particularly in the extrusion step of the cable manufacturing.

DETAILED DESCRIPTION

For the purpose of the present description and of the appended claims, the words "a" or "an" should be read to include one or at least one and the singular also includes the plural unless it is obvious that it is meant otherwise. This is done merely for convenience and to give a general sense of the disclosure.

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

Moreover, in the present description, it is to be understood that the technical features described specifically above and below can be combined with each other in any way, constituting further embodiments of the present disclosure which may not be specifically described for conciseness, but which fall within the scope of the present disclosure.

In the present description and claims, unless specified otherwise, the amount of the components of the flame-retardant polymer composition is given in phr where the term "phr" is used to indicate parts by weight per 100 parts by weight of the base polymeric material.

In the present description the amount of the components of the flame-retardant polymer composition can also be given in percent by weight (wt %) where the term "wt %" is used to indicate percent by weight with respect to the total amount of the composition.

Figure 2:
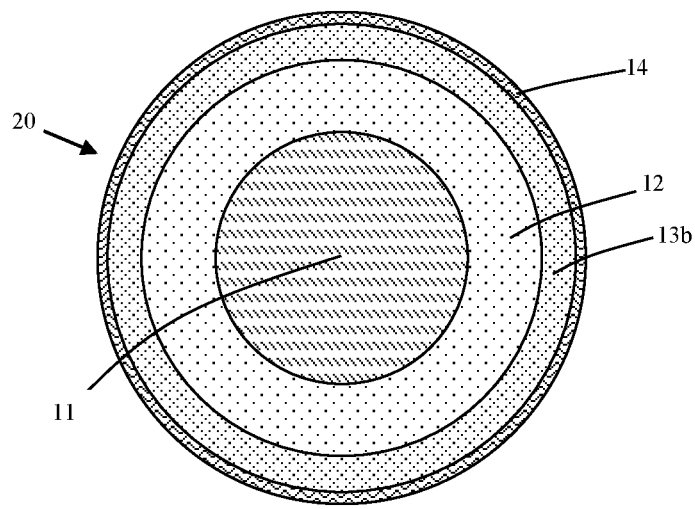
Figure 3:
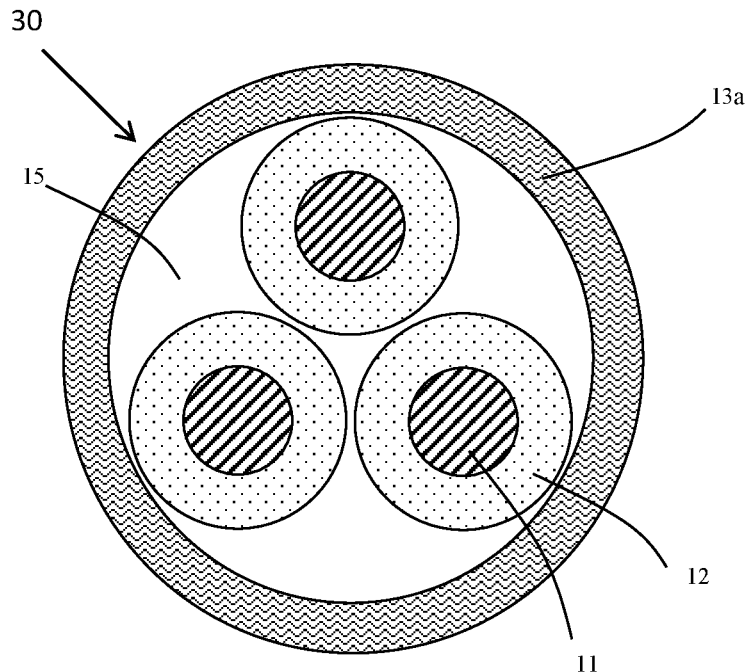
Figure 4:
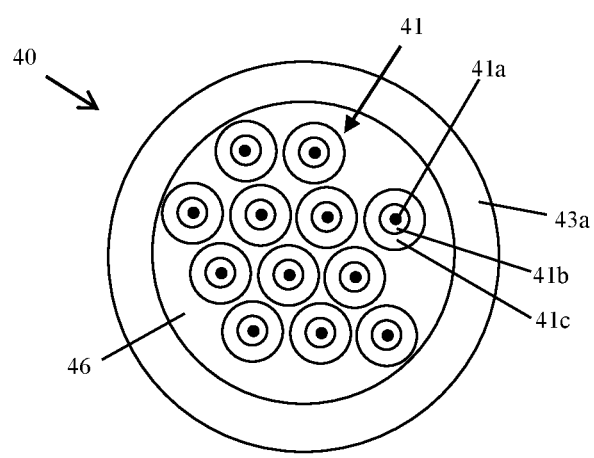

The features and advantages of the present disclosure will be made apparent by the following detailed description of some exemplary embodiments thereof, provided merely by way of non-limiting examples, description that will be conducted also by referring to the attached drawings, wherein FIG. 1 is a cross-sectional view of an electric cable according to the present disclosure; and FIG. 2 is a cross-sectional view of another electric cable according to the present disclosure;

FIG. 3 is a cross-sectional view of a three-phase electric cable according to the present disclosure; and FIG. 4 is a cross-sectional view of an optical cable according to the present disclosure.

FIG. 1 shows a low voltage (LV) electric cable 10 according to a non-limiting embodiment of the disclosure. Cable 10 has a single core comprising a conductor 11 made of an electrically conductive material, e.g. at least one of aluminium, copper or carbon nanotubes. The conductor 11 may be in the form of a solid bar or a of bundle of wires, optionally stranded.

The conductor 11 is electrically insulated by an insulating layer 12 in form of an extruded polymeric coating optionally having flame-retardant properties. For example, the insulating layer 12 can be made of an extruded polymeric material such as polyethylene or a polyethylene mixture, optionally filled with flame-retardant fillers, such as magnesium or aluminium hydroxide, but not the other components of the polymeric composition according to the present disclosure.

In the embodiment shown in FIG. 1, the insulating layer 12 is extruded in direct contact with the conductor 11.

Cable 10 comprises a jacket 13a as outermost layer, made of a polymeric material optionally having flame-retardant properties. The jacket 13a surrounds the insulating layer 12 and, optionally, is in direct contact thereto. The jacket 13a is manufactured by extrusion. The jacket 13a has a thickness suitable for providing the cable with mechanical protection.

In cable 10 the insulating layer 12 and/or the jacket 13a can be made of a polymeric composition according to the present disclosure.

FIG. 2 shows a low voltage (LV) electric cable 20 according to another non-limiting embodiment of the disclosure. In the cable 20, those features that are structurally and/or functionally equivalent to corresponding features of the cable 10 described above will be assigned the same reference numbers of the latter and will not be further described for conciseness.

The cable 20 differs from the cable 10 described above in that the outermost layer is a skin layer 14, made of the polymeric composition according to the present disclosure. The skin layer 14 surrounds and directly contacts a jacket 13b.

The skin layer 14 is manufactured by extrusion. The skin layer 14 has a thickness substantially smaller than that of the jacket 13b (of from 0.05 to 0.5 mm, for example of from 0.1 to 0.2 mm) and does not provide significant mechanical protection to the cable 20.

In this embodiment, the insulating layer 12 and/or the jacket 13b can be made of an extruded LSOH polymer material, e.g. LSOH polymer material including a base polymer such as polyethylene or a polyethylene mixture, filled with flame-retardant fillers, such as magnesium or aluminium hydroxide, but not the other components of the polymeric composition according to the present disclosure.

FIG. 3 shows a low voltage (LV) electric cable 30 according to another non-limiting embodiment of the disclosure. Cable 30 is a three-phase cable comprising three cores. Each core comprises a conductor 11 surrounded by an electrically insulating layer 12, like those described for cable 10 of FIG. 1.

The three cores are stranded and surrounded by a jacket 13a as outermost layer, said jacket having the features already described in connection to jacket 13a of cable 10 of FIG. 1. A bedding 15 made of polymeric material can be provided filling the gaps between the stranded cores and the jacket 13.

FIG. 4 shows an optical cable 40 according to another non-limiting embodiment of the disclosure. Cable 40 comprises a number (in this case, twelve) of conductors in form of optical fibres 41 comprising a glass core (light waveguide+cladding) 41a, a protective layer 41b (made, for example, of one or two layers of radiation cured acrylate) and a buffer layer 41c (made, for example, of an extruded polyolefin).

The optical fibres 41 are surrounded by a jacket 43a as outermost layer, said jacket being made of the polymeric composition according to the present disclosure.

Between the optical fibres 41 and the jacket 43a a filler 46 can be provided in form, for example, of a water-blocking and/or hydrogen absorbing material.

The low smoke zero halogen (LSOH) flame-retardant polymer composition according to the present disclosure comprises an halogen free base polymer which can be thermoplastic or crosslinked. Suitable polymer can be or include at least one ethylene or propylene polymer.

Ethylene polymer, as the term is used therein, is a homopolymer of ethylene such as a low density polyethylene (LDPE), or a copolymer of ethylene with one or more alpha-olefins having 3 to 12 carbon atoms, for example 4 to 8 carbon atoms, and, optionally, comprising a diene, such as an ethylene-propylene rubber (EPR), a linear low density polyethylene (LLDPE), or a very low density polyethylene (VLDPE).

In an embodiment, the halogen free base polymer of the flame-retardant composition of the present disclosure can be or include a copolymer of ethylene with 1-butene, 1-hexene and 1-octene.

The ethylene polymer can also be a copolymer of ethylene and an unsaturated ester such as a vinyl ester (for example, vinyl acetate or an acrylic or methacrylic acid ester), a copolymer of ethylene and an unsaturated acrylic acid, such as ethylene vinyl acetate (EVA), ethylene butyl acrylate (EBA), ethylene methyl acrylate (EMA) and ethylene ethyl acrylate (EEA).

In an embodiment, the halogen free base polymer of the flame-retardant composition of the present disclosure comprises a copolymer of ethylene with a co-monomer selected from ethylene vinyl acetate (EVA).

In an embodiment, the base polymer of the polymer composition according to the disclosure is made of at least one polyethylene homopolymer or polyethylene copolymer, like a linear low-density polyethylene (LLDPE) or very low density polyethylene (VLDPE), or of a mixture thereof.

In an embodiment, the at least one polyethylene copolymer of the base polymer of the present polymer composition is a metallocene LLDPE.

In an embodiment, the base polymer of the polymer composition according to the disclosure is made of a mixture of a LLDPE or a VLDPE and an ethylene vinyl acetate (EVA) copolymer.

The polyethylene homopolymer or the copolymer of ethylene with one or more alpha-olefins having 3 to 12 carbon atoms, and, optionally, comprising a diene such as LLDPE have a density of 0.94 g/cm$^3$ at most. In an embodiment, the polyethylene homopolymer or copolymer have a density in the range of 0.86 to 0.92 g/cm$^3$.

In case of a crosslinked polymer base for the present composition, the crosslinking is carried out by silane/peroxide. Suitable silane crosslinking agents are vinyltrimethoxysilane and vinyltriethoxysilane.

The flame-retardant polymer composition of the present disclosure further comprises a metal hydroxide lower than 170 phr. In an embodiment, the flame-retardant polymer composition of the present disclosure comprises a metal hydroxide in amount from 100 phr to 160 phr or in amount from 100 phr to 150 phr.

In an embodiment, the metal hydroxide is selected from magnesium hydroxide, aluminium hydroxide or a combination thereof. An example of metal hydroxide suitable for the present cable is magnesium hydroxide, for example of natural origin (brucite), optionally surface treated.

In an embodiment, when the polymer base is mainly, but not exclusively, composed by EVA as base polymer, the metal hydroxide is magnesium hydroxide.

The flame-retardant polymer composition of the present disclosure further comprises a phyllosilicate clay in an amount from 1 to 10 phr, for example in an amount from 2 to 6 phr.

The phyllosilicate clay can be layered.

The phyllosilicate clay can be selected from the group consisting of bentonite, montmorillonite, magadiite, saponite, laponite, sepiolite, attapulgite, hectorite, beidellite, vermiculite, kaolinite, nontronite, volkonskoite, stevensite, pyrosite, sauconite, kenyaite and combinations thereof. In an embodiment, the phyllosilicate clay in the composition of the present disclosure is selected from montmorillonite or bentonite.

The phyllosilicate clay may be naturally occurring or chemically modified.

In an embodiment, the phyllosilicate clay included in the flame-retardant polymer composition of the present disclosure has an average particle size dimensions (average particle size $d_{50}$) of from 5 to 35 µm.

In an embodiment, the phyllosilicate clay included in the flame-retardant polymer composition of the present disclosure is a montmorillonite. Montmorillonite may be naturally occurring and/or is layered. In an embodiment, a naturally occurring montmorillonite may be purified according to conventional purification processes before its use in the flame-retardant polymer composition of the present disclosure.

In an embodiment, the phyllosilicate clay suitable for the present compositions is chemically modified, for example by coating. This is obtained, for example, by exchanging some of the cations (for example, sodium ions) in the phyllosilicate clay, by surface treatment with an ammonium or phosphonium cation-containing compound, such as a salt. Suitable coated phyllosilicate clays for the cable of the present disclosure contain, for example, alkyl or polyol ammonium or phosphonium.

In an embodiment, an ammonium coated montmorillonite contains (is surface treated with) dimethyl, di(hydrogenated tallow) ammonium.

The cationic coating allows increasing the compatibility of the phyllosilicate clay with the polymeric matrix.

The phyllosilicate clay acts essentially as flame-retardant aid. The presence of a phyllosilicate clay in the flame-retardant polymeric composition of the present disclosure in the amount indicated above allows improving the flame-retardant properties in combination with the metal hydroxide and also allows reducing the amount of metal hydroxide to be used in the flame-retardant polymer composition, thereby preventing the mechanical properties of the polymer composition from deteriorating while maintaining good workability by decreasing the viscosity of the polymer composition.

Furthermore, the phyllosilicate clay increases significantly the resistance to dripping of the polymeric material forming the coating layer of the cable.

The flame-retardant polymer composition of the present disclosure further comprises melamine or a derivative thereof, and an alkali or alkaline-earth metal carbonate as further flame-retardant aids.

Examples of melamine derivatives that can be included in the flame-retardant polymer composition of the present disclosure include melamine cyanurates.

The amount of melamine or of a derivative thereof in the flame-retardant polymer composition of the disclosure is at least 1 phr and less than 10 phr.

An amount of melamine or a derivative thereof lower than 1 phr brings no substantial effect in the flame-retardant polymer composition; while an amount of melamine or a derivate thereof of 10 phr or more can produce undesired amounts of potentially irritating fumes as, under fire, melamine undergoes progressive endothermic condensation with the release of ammonia.

A suitable alkali or alkaline-earth metal carbonate (hereinafter also referred to as "carbonate") for the present composition can be selected from sodium carbonate, magnesium carbonate, calcium carbonate or mixture thereof, either synthetic or naturally occurring, like, for example, dolomite. In an embodiment, the flame-retardant polymer composition of the present disclosure comprises calcium carbonate.

The amount of carbonate in the flame-retardant polymer composition of the disclosure is not particularly limited and can be chosen by the skilled person in such a way to not impair the mechanical properties and the electrical properties of the cable formed using such a polymer composition.

In an embodiment, the amount of carbonate in the flame-retardant polymer composition of the disclosure is comprised in the range of from 20 phr to 70 phr.

Applicant experienced that the presence of flame-retardant aids consisting of a combination of a phyllosilicate clay, melamine or a derivative thereof, and carbonate as indicated above in a flame-retardant polymer composition used for the manufacture of a coating layer of a cable, not only contributes to improve the flame-retardant properties of the cable in combination with the metal hydroxide, but also increases significantly the resistance to dripping of the polymer material forming such coating layer.

As shown in the examples, flame-retardant polymer compositions according to the present disclosure exhibit self-extinguishing behaviour and no flaming droplet production (dripping) when exposed, even repeatedly, to flame, thereby meeting the stricter requirements for certification according to the current international standards such as the above mentioned CPR. This result is achieved regardless of the type of metal hydroxide used as flame-retardant filler such as magnesium hydroxide or aluminium hydroxide.

At the same time, mechanical properties of the cable and the workability of the polymer composition, particularly in extrusion processes, are not impaired.

The flame-retardant polymer composition may further comprise conventional components such as antioxidants, processing aids, stabilizers, pigments, coupling agents, etc.

Conventional antioxidants which are suitable for this purpose are by way of example: polymerized trimethyldihydroquinoline, 4,4'-thiobis (3-methyl-6-tert-butyl) phenol, pentaerythritol tetrakis [3-(3,5-di-terz-butyl-4-hydroxyphenyl) propionate], 2,2'-thio-diethylene-bis-[3-(3,5-di-tert-butyl-4-hydroxy-phenyl) propionate] and the like or mixtures thereof.

Process aids usually added to the base polymer are, for example, calcium stearate, zinc stearate, stearic acid, paraffin wax, silicone rubbers and the like, and mixtures thereof.

The lubricants used are, for example, paraffin waxes of low molecular weight, stearic acid, stearammide, oleammide, erucamide.

Coupling agents may be used with the aim of further improving compatibility between the flame-retardant inorganic fillers and/or aids as indicated above and polymer matrix. This coupling agent can be selected from those known in the art, for example: saturated silane compounds or silane compounds containing at least one ethylenic unsaturation, like 3-aminopropyltriethoxysilane. As an alternative, monocarboxylic acids or dicarboxylic acids anhydrides, optionally grafted onto the polymeric base, may be used.

In an embodiment, the coupling agent (compatibilizer) included in the flame-retardant polymer composition of the present disclosure is an anhydride-modified polyethylene homopolymer or copolymer, for example ethylene propylene rubber. Suitable amount of coupling agent to be used in the composition of the present disclosure may range from 5 to 12 phr.

The electric cable according to the present disclosure may be produced based on cable manufacturing techniques known to those skilled in the art. In particular, the coating layer according to the present disclosure may be formed using conventional processes with a thickness chosen to comply requirements and needs of the particular application for the cable.

The present disclosure will now be described with reference to the following examples which are provided for purpose of illustration only and thus are not to be construed as limiting the scope of the present disclosure in any way.

EXAMPLES

Comparative flame-retardant polymer base compositions and compositions according to the disclosure were prepared by mixing, in an open mixer, polymers, flame-retardant (metal hydroxide), flame-retardant aids and other additives as indicated in the following Table 1.

The polymeric base was made of a mixture of a LLDPE having a density of 0.911 g/cm$^3$ and EVA having a vinyl acetate (VA) content of 28%. The metal hydroxide was natural magnesium hydroxide (brucite) with no surface treatment, or precipitated aluminium hydroxide, having a $d_{50}$ particle size greater than 2 µm in either case.

The phyllosilicate clay was an ammonium coated montmorillonite having average particles dimensions of 15-20 µm.

An anhydride-modified polyethylene was used as coupling agent (compatibilizer).

As "melamine" component a melamine cyanurate (1:1 mixture of 1,3,5-triazine-2,4,6 (1H,3H,5H)-trione, compound and 1,3,5-triazine-2,4,6) was used.

The comparative compositions and compositions of the disclosure were then extruded from the mixer into respective samples suitable for fire-resistance tests and for evaluation of mechanical properties.

Table 1 shows the amounts of base polymers, fillers and flame-retardant aids in the compositions used to produce both comparative and test samples, where the comparative samples are marked with an asterisk.

The amounts are provided as "phr", i.e. parts by weight per 100 parts by weight of the base polymers, and in wt % (in parenthesis).

TABLE 1

| Component | Sample A* | Sample B* | Sample C* | Sample E* | Sample F* | Sample G | Sample H | Sample I | Sample J* | Sample K* |
|---|---|---|---|---|---|---|---|---|---|---|
| EVA | 70.0 (25.9) | 70.0 (25.9) | 70.0 (24.5) | 70.0 (25.5) | 70.0 (25.5) | 70.0 (25.5) | 70.0 (25.5) | 70.0 (25.5) | 70.0 (23.9) | 70.0 (23.9) |
| LLDPE | 20.0 (7.4) | 20.0 (7.4) | 20.0 (7.0) | 20.0 (7.1) | 20.0 (7.1) | 20.0 (7.1) | 20.0 (7.1) | 20.0 (7.1) | 20.0 (6.8) | 20.0 (6.8) |
| Compatibilizer | 10.0 (3.7) | 10.0 (3.7) | 10.0 (3.5) | 10.0 (3.5) | 10.0 (3.5) | 10.0 (3.5) | 10.0 (3.5) | 10.0 (3.5) | 10.0 (3.4) | 10.0 (3.4) |
| Mg(OH)$_2$ | — | 170.0 (63.0) | 170.0 (59.6) | 170.0 (60.7) | — | 140.0 (50.0) | 110.0 (39.2) | — | 170.0 (58.2) | — |
| Al(OH)$_3$ | 170.0 (63.0) | — | — | — | 170.0 (60.7) | — | — | 140.0 (50.0) | — | 170.0 (58.2) |
| Montmorillonite | — | — | 5.0 (1.8) | 5.0 (1.8) | 5.0 (1.8) | 5.0 (1.8) | 5.0 (1.8) | 5.0 (1.8) | 7.0 (2.4) | 7.0 (2.4) |
| Melamine | — | — | 10.0 (3.5) | 5.0 (1.8) | 5.0 (1.8) | 5.0 (1.8) | 5.0 (1.8) | 5.0 (1.8) | 15.0 (5.1) | 15.0 (5.1) |
| CaCO$_3$ | — | — | — | — | — | 30.0 (10.7) | 60.0 (21.4) | 30.0 (10.7) | — | — |
| 1$^{st}$ Burning Extinction | Yes | Yes | Yes | Yes | Yes | Yes | Yes | Yes | Yes | Yes |
| 1$^{st}$ Droplet/min | 2.4 | 0 | 0 | 0 | 0.2 | 0 | 0 | 0 | 0 | 0 |
| 2$^{nd}$ Burning Extinction | Yes/No | Yes | No | Yes | Yes | Yes | Yes | Yes | No | No |
| 2$^{nd}$ Droplet/min | 5.4 | 0 | 0.6 | 0 | 0.3 | 0 | 0 | 0 | 0 | 0 |
| Elongation @ break (%) (≥100) | | | | | | 100 | 109 | | | |
| Tensile strength (MPa) (≥9) | | | | | | 11.9 | 12.1 | | | |

The samples were tested by a vertical flaming test to determine their self-extinguishing capacity and dripping behaviour under fire conditions, according to an internal test as described below.

Each specimen (10 cm long) of a sample was vertically clamped on a support while the lower end was hanging free. Each specimen was burned a first time under the action of a flame oriented at about 90° with respect to the specimen and directed towards the lower end thereof. The flame was held in this position for 30 seconds, then the specimen self-extinguishing (i.e. the flame extinction before the specimen burning all along its length) and the amount of droplet/min were evaluated. If the specimen self-extinguished, the flame was applied again and held in position for 30 seconds, then the specimen was evaluated as above again.

The test was carried out on at least two specimens for each sample and the data provided in Table 1 are an average of the results.

Table 1 above reports the results of flaming and conductivity tests performed on the comparative and test samples.

It can be observed that Comparative samples B and E had a suitable self-extinguishing behaviour and zero droplets under fire, but these compositions comprise high amounts of magnesium hydroxide, exceeding that of the present disclosure. Comparative sample C, differing from sample E in an increased amount of melamine, did not self-extinguish at the second burning test, and the same was for Comparative sample J, having still higher amounts of both melamine and phyllosilicate clay.

Comparative sample A comprises an amount of aluminium hydroxide, exceeding that of the present disclosure. This sample provided droplets and its behaviour at the second burning was erratic as some specimens self-extinguished and others totally burned. Comparative sample F, differing from sample A in the addition of melamine and phyllosilicate clay, still provided droplets, while Comparative sample K having increased amounts of both melamine and phyllosilicate clay than Comparative sample F did not self-extinguished at the second burning.

Samples G, H and I according to the present disclosure self-extinguished at both the burning tests without providing droplets.

Mechanical properties, such as tensile strength and elongation at break, of samples G and H was found suitable for application in optical and electric cables.

The viscosity of the samples according to the present disclosure, evaluated e.g. according to ISO 289-1 (2015), was found appropriate for extrusion process at industrially profitable speed.

The invention claimed is:

1. A flame-retardant cable, the cable comprising
   at least one conductor, and
   a coating layer made from a low smoke zero halogen flame-retardant polymer composition comprising a halogen free base polymer added with:
   a) from 100 phr to 160 phr of at least one metal hydroxide;
   b) from 1 to 10 phr of a phyllosilicate clay;
   c) at least 1 phr and less than 10 phr of melamine or a derivative thereof; and
   d) from 20 to 70 phr of an alkali or alkaline-earth metal carbonate.

2. The cable according to claim 1, wherein the coating layer is the outermost layer of the cable.

3. The cable according to claim 1, wherein the base polymer is at least one selected from the group consisting of a thermoplastic polymer and a crosslinked polymer.

4. The cable according to claim 1, wherein the base polymer includes at least one ethylene homopolymer or copolymer having a density of equal to or less than 0.94 g/cm$^3$.

5. The cable according to claim 1, wherein the base polymer comprises a mixture of a LLDPE or a VLDPE, and an ethylene vinyl acetate copolymer.

6. The cable according to claim 1, wherein the metal hydroxide is magnesium hydroxide or aluminium hydroxide.

7. The cable according to claim 1, wherein an amount of the phyllosilicate clay in the flame-retardant polymer composition ranges from 2 to 6 phr.

8. The cable according to claim 1, wherein the phyllosilicate clay is montmorillonite or bentonite.

9. The cable according to claim 1, wherein the phyllosilicate clay is chemically modified.

10. The cable according to claim 1, wherein the flame-retardant polymer composition comprises a melamine derivative, which is at least one melamine cyanurate.

11. The cable according to claim 1, wherein the alkali or alkaline-earth metal carbonate is selected from the group consisting of sodium carbonate, magnesium carbonate, calcium carbonate, and a mixture thereof.

12. The cable according to claim 1, wherein the flame-retardant polymer composition further comprises an anhydride-modified polyethylene as a coupling agent.

13. The cable according to claim 12, wherein an amount of the anhydride-modified polyethylene in the flame-retardant polymer composition ranges from 5 to 12 phr.

14. A flame-retardant cable, the cable comprising
    at least one conductor, and
    a coating layer made from a low smoke zero halogen flame-retardant polymer composition comprising a halogen free base polymer added with:
    a) less than 170 phr of at least one metal hydroxide;
    b) from 1 to 10 phr of a phyllosilicate clay;
    c) at least 1 phr and less than 10 phr of melamine or a derivative thereof; and
    d) an alkali or alkaline-earth metal carbonate,
    wherein the phyllosilicate clay has an average particle size of from 5 to 35 µm.

* * * * *